UNITED STATES PATENT OFFICE.

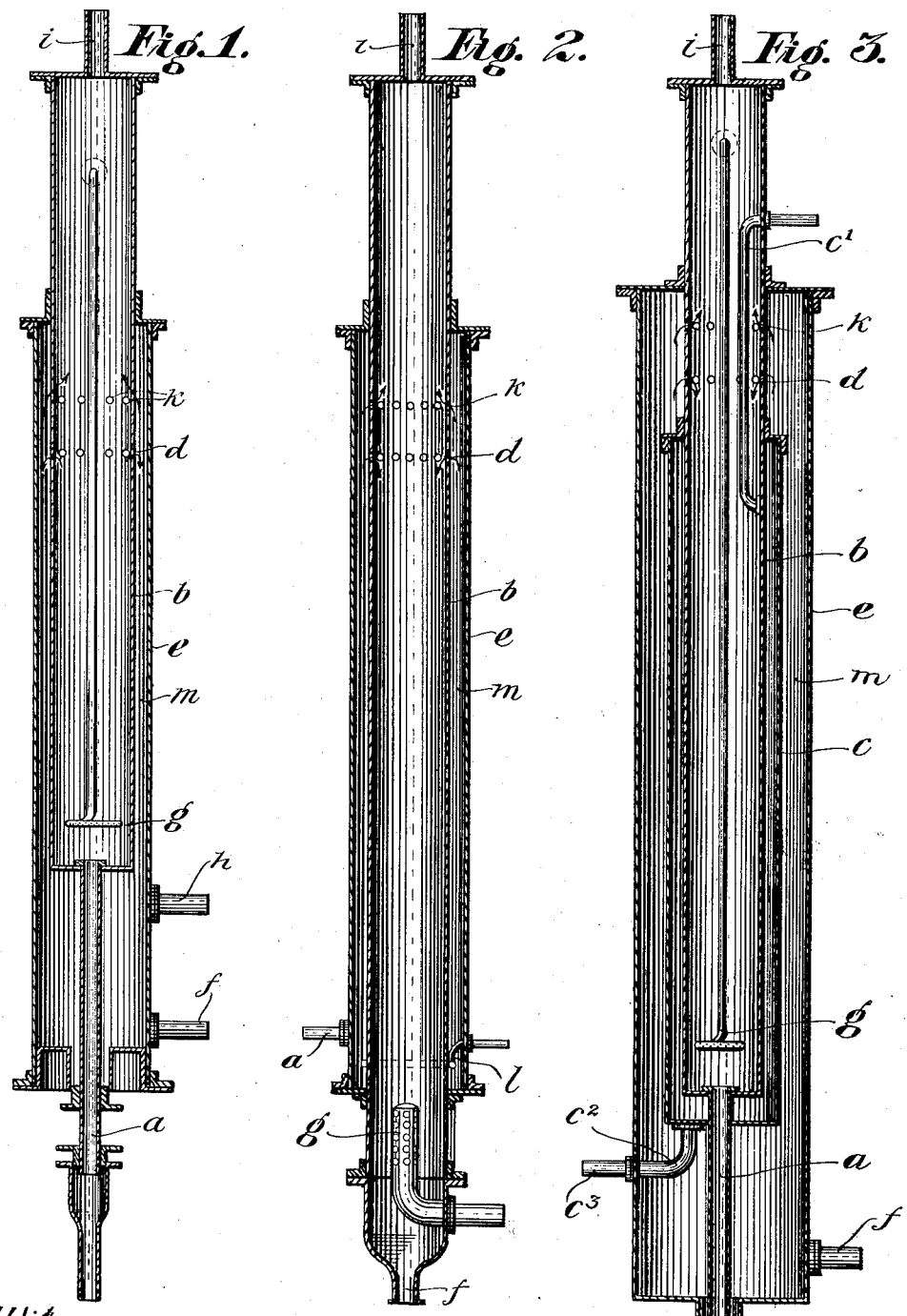

OTTO BRÜCKE, OF FRANKFORT-ON-THE-MAIN, GERMANY.

APPARATUS FOR THE PURIFICATION OF OILS AND SIMILAR BODIES.

963,510.  Specification of Letters Patent. Patented July 5, 1910.

Application filed April 17, 1908. Serial No. 427,753.

*To all whom it may concern:*

Be it known that I, OTTO BRÜCKE, a citizen of the German Empire, residing at Frankfort-on-the-Main, Germany, have invented new and useful Improvements in Apparatus for the Purification of Oils and Similar Bodies, of which the following is a specification.

My invention relates to an apparatus for the purification of oils, fats, and particularly fatty acids, but which may be used for a number of purposes in the chemical or physical treatment of various liquids.

In describing my invention I will refer to the accompanying drawings in which—

Figure 1 illustrates a central longitudinal section of an apparatus embodying my invention, and Figs. 2 and 3 are similar views illustrating modified constructions.

Referring to Fig. 1, $b$ represents a hollow body or cylinder which is telescoped in the end of a larger hollow body or cylinder $e$, the smaller cylinder extending for a greater portion of its length within the larger cylinder, but leaving a space at the bottom of the larger cylinder, as clearly shown. While the two hollow bodies $b$ and $e$ are shown as cylinders, it is to be understood that they may be rectangular in cross section, or of any other desired shape. The cylinder $e$, is made sufficiently large to afford a space $m$ between the wall of the two cylinders for the passage of the waste gases and the liquid being treated, as will be hereinafter described. Connected with the bottom of the smaller cylinder $b$, is a pipe $a$, which passes downwardly through the bottom of the larger cylinder $e$, a suitable packing being provided between said pipe and the bottom of the cylinder $e$, said pipe constituting the inlet pipe for the liquid to be treated. A horizontal row of holes $d$ is provided through the wall of the inner cylinder at a point at some distance above the bottom thereof to afford passages through which the liquid may pass from the smaller cylinder to the space $m$ between the two cylinders, and above said row of holes $d$ there is another series of holes $k$ for the passage of waste gases and vapors from the outer to the inner cylinder, the said gases or vapors passing from the inner cylinder through a pipe $i$ at the upper end thereof. The steam, air, or other agent which is to be employed to act on the liquid to be treated, passes into the smaller cylinder through a pipe which enters the cylinder near the top thereof and extends downwardly to a point near the bottom of the cylinder where it terminates in a rose $g$ through which the treating agent issues in a series of fine streams. The treating agent is also supplied to the outer or larger cylinder through an inlet pipe $h$ which is located above the outlet $f$ through which the treated liquid is discharged from the apparatus.

As hereinbefore indicated, the apparatus described may be used for a number of purposes in the chemical or physical treatment of various liquids. For instance, by passing heated oil or aqueous solutions, such as brine, in a continuous current through the pipe $a$, and introducing steam or other heating vapor through the pipes $g$ and $h$, an evaporation or purification may be effected. For instance, oils may be freed of volatile constituents, or brine and other solutions may be evaporated. The apparatus may also be usefully employed for the chemical treatment of various materials with air and other gases, as for instance in blowing linseed oil and other fat oils. For this purpose a current of linseed or other oil may be introduced in a continuous current through the pipe $a$ while air is blown through the pipes $g$ and $h$. The liquid to be treated passes through the pipe $a$ into the smaller cylinder $b$, which it fills up to the row or series of openings or holes $d$, the liquid at this point passing through said openings and flowing in a thin film or stream down the outer side of the wall of the inner cylinder to the bottom of the larger cylinder $e$, and then out of the apparatus through the outlet pipe $f$. The steam, air, or other treating agent is supplied to the inner cylinder through the rose $g$ which is submerged in the liquid being treated, the treating agent passing up through the liquid to cause a thorough contact or intermingling of the treating agent with the treated liquid, so that the latter may be heated, evaporated or aerated as the case may be. The treated liquid passes from the inner or smaller cylinder $b$ through the holes $d$, and as it passes down the outside of said cylinder in a thin film or sheet, it is further subjected to the treating agent which passes into the outer cylinder through the pipe $h$ and ascends into the space $m$ between the two cylinders. The waste gases and vapors in the smaller cylinder escape through the outlet $i$, while the gases and vapors in the outer cylinder pass into the inner cylinder through the openings $k$ and thence through the outlet $i$.

In Fig. 2, I have illustrated a modified form of apparatus in which the inner cylinder $b$ is made somewhat longer than the outer cylinder $e$, and extends both above and below the same. In this instance the liquid to be treated is admitted to the outer cylinder $e$ through a pipe $a$, and ascends in said cylinder to the openings $d$ through the wall of the inner cylinder, the liquid then descending along the inner surface of said cylinder in a thin film to and through the outlet $f$. The treating agent is supplied through a spraying rose $l$ in the outer cylinder, and through a spraying nozzle $g$ in the inner cylinder, the operation being the same as that described in connection with Fig. 1, except that the liquid to be treated passes through the apparatus in a reverse direction.

The construction illustrated in Fig. 3 corresponds substantially with that illustrated in Fig. 1, except that in the structure of Fig. 3, a jacket $c$ is provided around the inner cylinder $b$, this structure being more especially intended where the apparatus is to be used simply for heating or for cooling purposes. The heating or cooling agent is admitted to the jacket through a pipe $c'$ and passes out through a pipe $c^2$ to the circulating or outlet pipe $c^3$. The cooling or heating agent is also supplied to the inner cylinder $b$ through the spraying rose $g$, as before described. The direction of circulation of the fluid to be heated or cooled, may be either the same as that described in connection with Fig. 1, or in a reverse direction as referred to with reference to Fig. 2. In either case, the liquid being treated comes in actual contact with the heating or cooling agent only as it passes through the inner cylinder $b$.

Various other modifications might be made in the apparatus without departing from the main feature of my invention but those illustrated are deemed sufficient for the purposes of this specification.

Having thus described my invention, what I claim as new and desire to secure by Letters Patent is:

In an apparatus for the treatment of fluid substances, the combination of a pair of hollow bodies one being inserted within the other, pipes communicating with the inner and outer bodies respectively for the passage through the apparatus of the liquid to be treated, one of said pipes forming the inlet and the other the outlet for the liquid, openings in the wall of the inner body above the inlet pipe forming communicating passages between the inner and outer bodies, and pipes communicating with the inner and outer bodies for supplying the treating agent.

In testimony whereof I have signed my name to this specification in the presence of two subscribing witnesses.

OTTO BRÜCKE.

Witnesses:
JEAN GRUND,
CARL GRUND.